United States Patent
Brahm et al.

(10) Patent No.: US 6,744,062 B2
(45) Date of Patent: Jun. 1, 2004

(54) APPARATUS FOR RADIOGRAPHICALLY IMAGING ELONGATED OBJECTS

(75) Inventors: Roger S. Brahm, Canandaigua, NY (US); William A. Meredith, Rochester, NY (US); Dennis J. O'dea, Farmington, NY (US); David J. Steklenski, Rochester, NY (US); Xiaohui Wang, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 157 days.

(21) Appl. No.: 09/950,545

(22) Filed: Sep. 11, 2001

(65) Prior Publication Data

US 2003/0047696 A1 Mar. 13, 2003

(51) Int. Cl.[7] .............................................. B65D 85/00
(52) U.S. Cl. ....................................... 250/584; 378/174
(58) Field of Search ................................ 378/174, 182; 250/584

(56) References Cited

U.S. PATENT DOCUMENTS

| | | | | |
|---|---|---|---|---|
| 3,725,703 A | * | 4/1973 | Bucky | 378/174 |
| 3,774,045 A | * | 11/1973 | Trott | 378/174 |
| 4,613,983 A | | 9/1986 | Yedid et al. | |
| 5,712,486 A | * | 1/1998 | Soltani et al. | 378/184 |
| 5,986,279 A | | 11/1999 | Dewaele | |

FOREIGN PATENT DOCUMENTS

| | | |
|---|---|---|
| EP | 0 866 342 A1 | 9/1998 |
| EP | 0 919 856 A1 | 6/1999 |
| EP | 0 919 858 A1 | 6/1999 |

* cited by examiner

Primary Examiner—Constantine Hannaher
(74) Attorney, Agent, or Firm—William F. Noval

(57) ABSTRACT

Apparatus for radiographically imaging elongated objects comprising: a vertical main frame; a base mounted on said main frame; a first support on said base for supporting a first cassette containing a first storage phosphor imaging plate; a door hingedly mounted on said base for movement between open and closed positions; said door having a light-tight enclosure for supporting a second cassette containing a second storage phosphor imaging plate removably mounted within a cassette shell; and a first mechanism for removing said cassette shell from said second storage phosphor imaging plate which remains supported within said light-tight enclosure; such that, when said door is in said closed position, said second storage phosphor imaging plate overlaps said first storage phosphor imaging plate, whereby an elongated object can be radiographically imaged onto said overlapping first and second storage phosphor imaging plates.

10 Claims, 6 Drawing Sheets

APPARATUS FOR RADIOGRAPHICALLY IMAGING ELONGATED OBJECTS

CROSS REFERENCE TO RELATED APPLICATIONS

Reference is made to co-pending U.S. patent application Ser.No. 09/950,544, filed on Sep. 11, 2001, titled: "Method For Stitching Partial Radiation Images To Reconstruct A Full Image" inventors Wang et al

FIELD OF THE INVENTION

This invention relates in general to digital radiography, and in particular to the imaging of an elongated object such as a long human body part, such as the spine or legs, using a storage phosphor-based computed radiography system.

BACKGROUND OF THE INVENTION

When an elongated object such as a long segment of the human body (legs, spine) is imaged radiographically using the conventional screen-film technique, special cassettes and films of extended length are used, such as 30×90 cm and 35×105 cm. The radiographic assessment of scoliosis patients begins with erect anteroposteries and lateral views of the entire spine. This can be accomplished with a radiograph that is (91.5 cm) in length. Long bone images are necessary when an evaluation of a larger portion of the skeletal system must be viewed as a whole and radiographs of up to (130 cm) in length are desirable. As medical institutions are migrating from analog screen-film systems to digital modalities, such as computed radiography (CR), these types of exams impose a significant challenge. This is because the size of digital detector is limited. For example, the largest CR storage phosphor cassette from several major CR vendors is limited to 35×43 cm, which can only image a portion of the long body part at a time. To address this problem, several methods have been proposed. European Patent EP0919856A1 discloses a way of staggering several storage phosphor cassettes together. The cassettes can be in an alternating, staircase-wise, or oblique arrangement. During the x-ray exposure, all the partially overlapping cassettes are exposed simultaneously, therefore each storage phosphor screen that resides inside the corresponding cassette records a part of the image of the long body part. The drawback of this approach is that the metallic frames of the front (closer to the x-ray source) cassettes impose shadows in the image recorded in the back cassettes. The shadows are not removable and therefore may hinder diagnostic interpretation of the acquired images. European Patent EP0866342A1 (also US Pat. No. 5,986,279, issued Nov. 16, 1999, inventor Dewaele) presents a method that is based on partially overlapping a plurality of storage phosphor screens for extended imaging coverage. The screens can also be configured in an alternating, staircase-wise, or oblique overlapping arrangement. Further, the screens can be contained in a single, extended length cassette for convenience of use. This approach overcomes the drawback of the cassette stacking method because there are no cassette metallic frames present in the x-ray path. However, in practice, this method requires that the storage phosphor screens be removed from the cassettes before imaging, and to be placed back into the cassettes in a darkroom after the x-ray exposure, which is cumbersome in the clinical environment.

The sub-images acquired by the individual storage phosphor screens must be stitched together to create a composite full image. The stitched full image should be distortion-free for the purposes of diagnostic interpretation and geometric measurement. U.S. Pat. No. 4,613,983, issued Sep. 23, 1986, inventors Yedid et al., discloses a method to reconstruct a composite radiographic image from a set of sub-images. However, this method is applicable only when the relative position between the sub-images is precisely controlled by the acquisition hardware. European Patent EP0919858A1 proposes a method that utilizes a pattern of reference markers that impose shadows simultaneously with the diagnostic image in each of the acquired sub-images. The drawback of this method is that a precisely fabricated pattern of reference markers must be imaged simultaneously with the patient in order to achieve precise geometric registration of the sub-images. The shadow of the reference markers may obscure diagnostically important information in the stitched image.

It is therefore desirable to develop a computed radiography system for elongated images such as of the spine and leg.

SUMMARY OF THE INVENTION

According to the present invention, there is provided a solution to the problems discussed above.

According to a feature of the present invention, there is provided an apparatus for radiographically imaging elongated objects comprising: a vertical main frame; a base mounted on said main frame; a first support on said base for supporting a first cassette containing a first storage phosphor imaging plate; a door hingedly mounted on said base for movement between open and closed positions; said door having a light-tight enclosure for supporting a second cassette containing a second storage phosphor imaging plate removably mounted within a cassette shell; and a first mechanism for removing said cassette shell from said second storage phosphor imaging plate which remains supported within said light-tight enclosure; such that, when said door is in said closed position, said second storage phosphor imaging plate overlaps said first storage phosphor imaging plate, whereby an elongated object can be radigraphically imaged onto said overlapping first and second storage phosphor imaging plates.

According to another feature of the present invention there is provided a computed radiography cassette comprising: a cassette shell; a storage phosphor imaging plate removably contained within said cassette shell; and a handle detachably mounted on said cassette shell for facilitating removal of said cassette shell relative to said storage phosphor imaging plate.

According to still another feature of the present invention there is provided a method of radiographically imaging an elongated object comprising: positioning a first cassette containing a first storage phosphor imaging plate in overlapping relationship with a second storage phosphor imaging plate which has been removed from its cassette plate; and exposing said overlapped first and second storage phosphor imaging plates to a radiographic image of an elongated object wherein said second plate is closer to said source of said radiographic image than said first plate.

ADVANTAGEOUS EFFECT OF THE INVENTION

The invention has the following advantages.
1. Radiographic images of elongated objects, such as the leg and spine, can be taken in a simple, efficient and cost effective manner.
2. Unwanted artifacts in the image are minimized due to the external structure of cassettes when overlapping cassettes are used.

3. Use of an alignment grid or other external marks is eliminated.

DETAILED DESCRIPTION OF THE INVENTION

In general, the present invention relates to apparatus for radiographic imaging of an elongated object. The most common application of the present invention is radiographic imaging of a long segment of the human body such as the spine or leg. Computed radiography cassettes include cassette shells having removably mounted storage phosphor imaging plates contained therein. In the embodiment shown, four computed radiography cassettes of conventional size are mounted in a vertical, sequential arrangement such that, during exposure, two cassettes containing imaging plates are overlapping by imaging plates removed from their cassettes. This arrangement eliminates image artifacts produced when four cassettes with imaging plates are overlapped. It will be understood that more or less than four components can be used.

Figure 1:
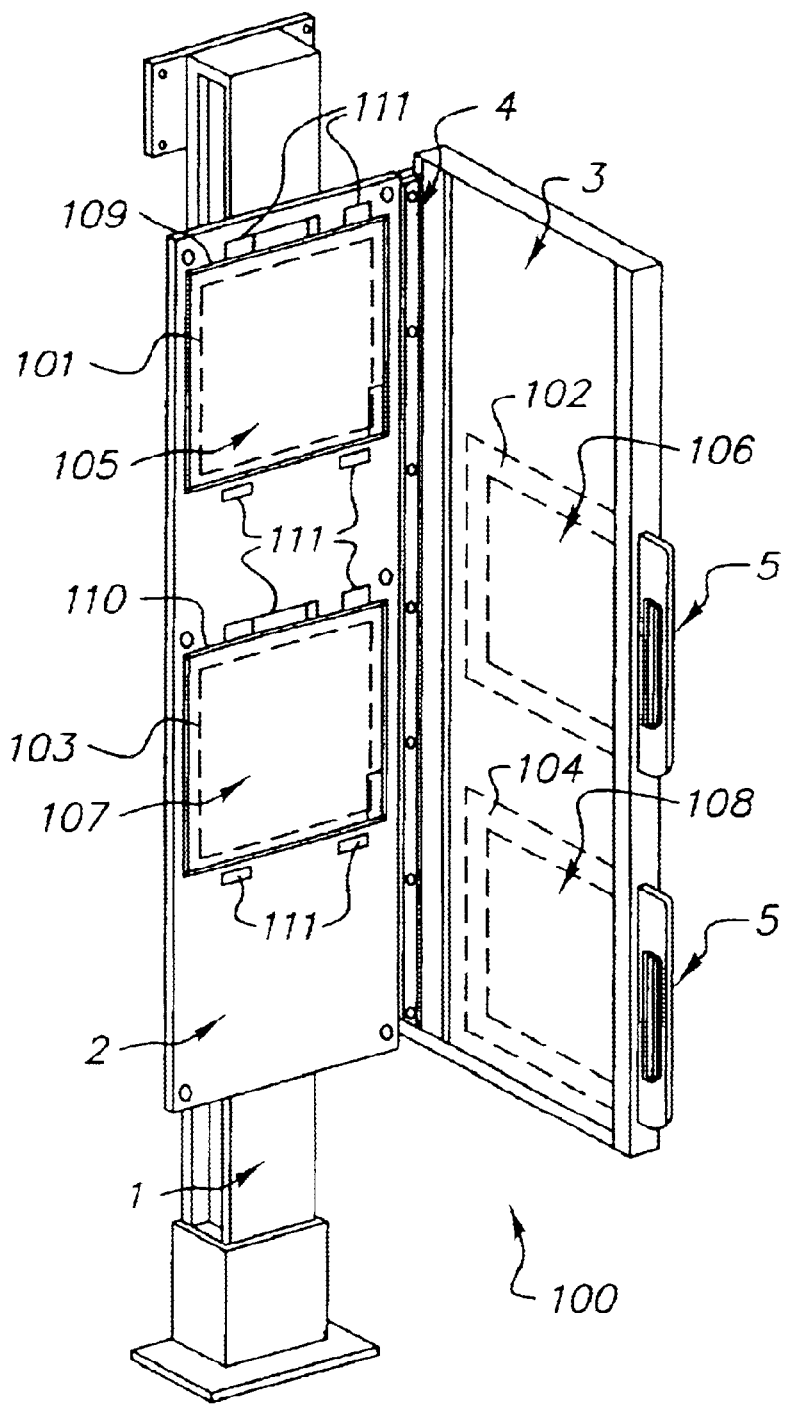
FIGS. 1–3 are diagrammatic perspective views of an embodiment of the present invention.

FIG. 1 depicts an embodiment of the present invention to hold radiographic image media. Apparatus (100) includes a vertical main frame (1) having a base (2) and door (3) slidably mounted on frame (1) via a slide such that it can be adjusted up and down to move the available image area to a desired height. A fixed base (2) and a door (3) are shown in the open position. First, second, third and fourth CR cassettes (101–104) contain removable storage phosphor imaging plates (105–108). The door (3) is attached to the fixed base (2) via a hinge (4). Two of the cassettes (102, 104) have a special handle (5) attached to them. Door (3) is a light-tight box-like enclosure. The door (3) has integral to it, flexible light plush material such that a light-tight seal is created around the handle into the light-tight enclosure. This seal has the ability to completely close off the opening once the handle and cassette structure has been removed. Two cassettes (101, 103) are shown supported in recesses (109, 110) in the fixed base (2). They are securely held into the nests by the use of spring loaded rollers (111) which detent into the side rails of the cassettes (101, 103).

Figure 2:
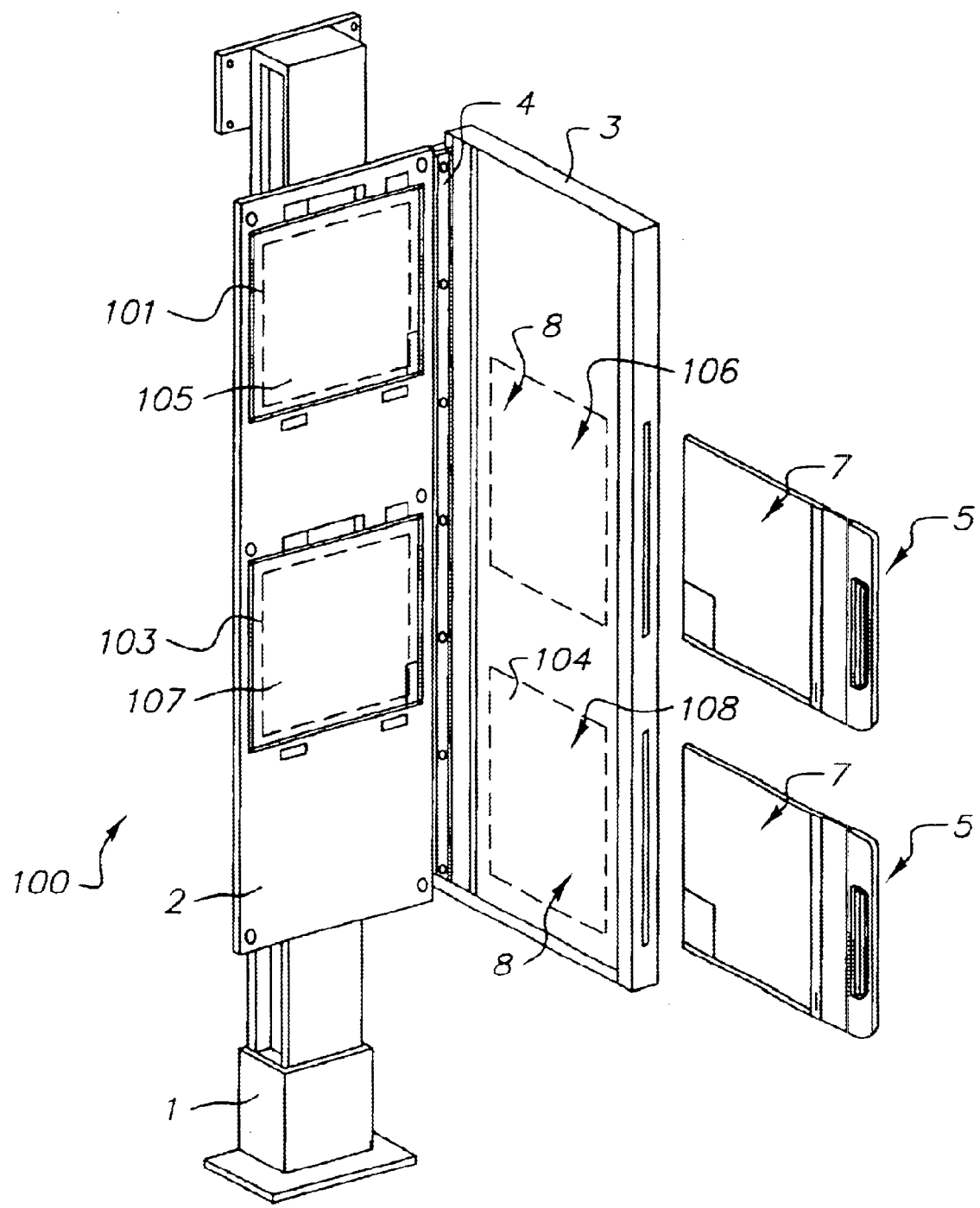

FIG. 2 is a replicate of FIG. 1, with the exception that two of the cassette shells have been removed from cassettes (102, 104). This is accomplished by activating a mechanism (8) (FIG. 5) that unlatches the image plates from the cassette shells (7). The insertion of the cassettes automatically actuates this mechanism, releasing the image plates. The shells are then removed manually with the assistance of special handles (5).

Figure 3:
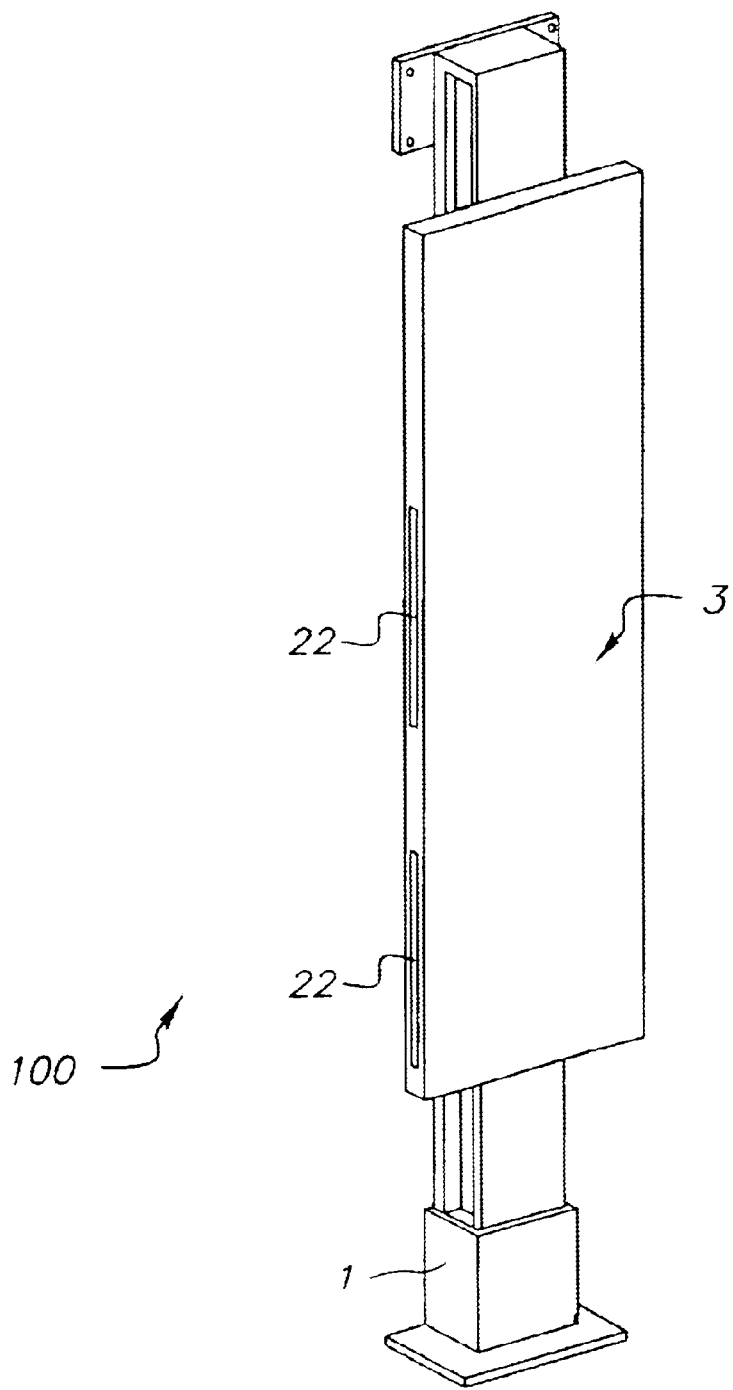

FIG. 3 depicts the door (3) shown in the closed position. When the door (3) is in the closed position, the image plates (106, 108) that are contained within it are placed in front of the full cassettes (101, 103) with plates (105, 107) which are nested in the fixed base (2).

Figure 4:
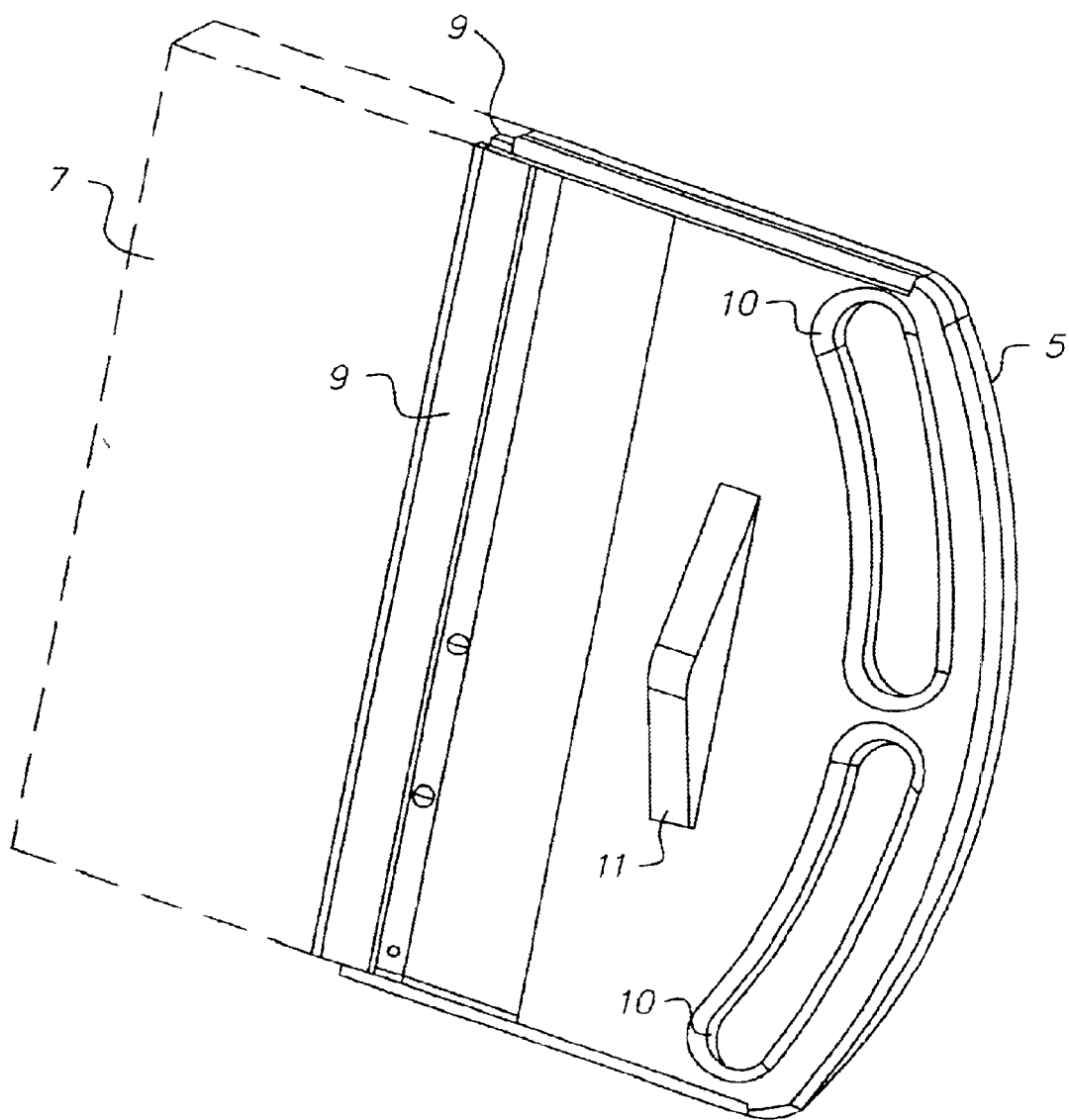
FIG. 4 is a diagrammatic perspective view of another embodiment of the present invention.

FIG. 4 depicts the special handle (5) in greater detail. The handle is secured to the cassette shell (7) via a clamping action provided by clamp extrusions (9). To minimize the amount of wrist rotation necessary to insert the cassette, two semi-circular grips (10) are an integral feature of the special handle. An anti-close feature (11) protrudes from the special handle (5). This feature prevents the door (3) from being closed should the cassette shells (7) not be removed. This prevents an inadvertent exposure being taken with cassette shells (7) still in place.

Figure 5:
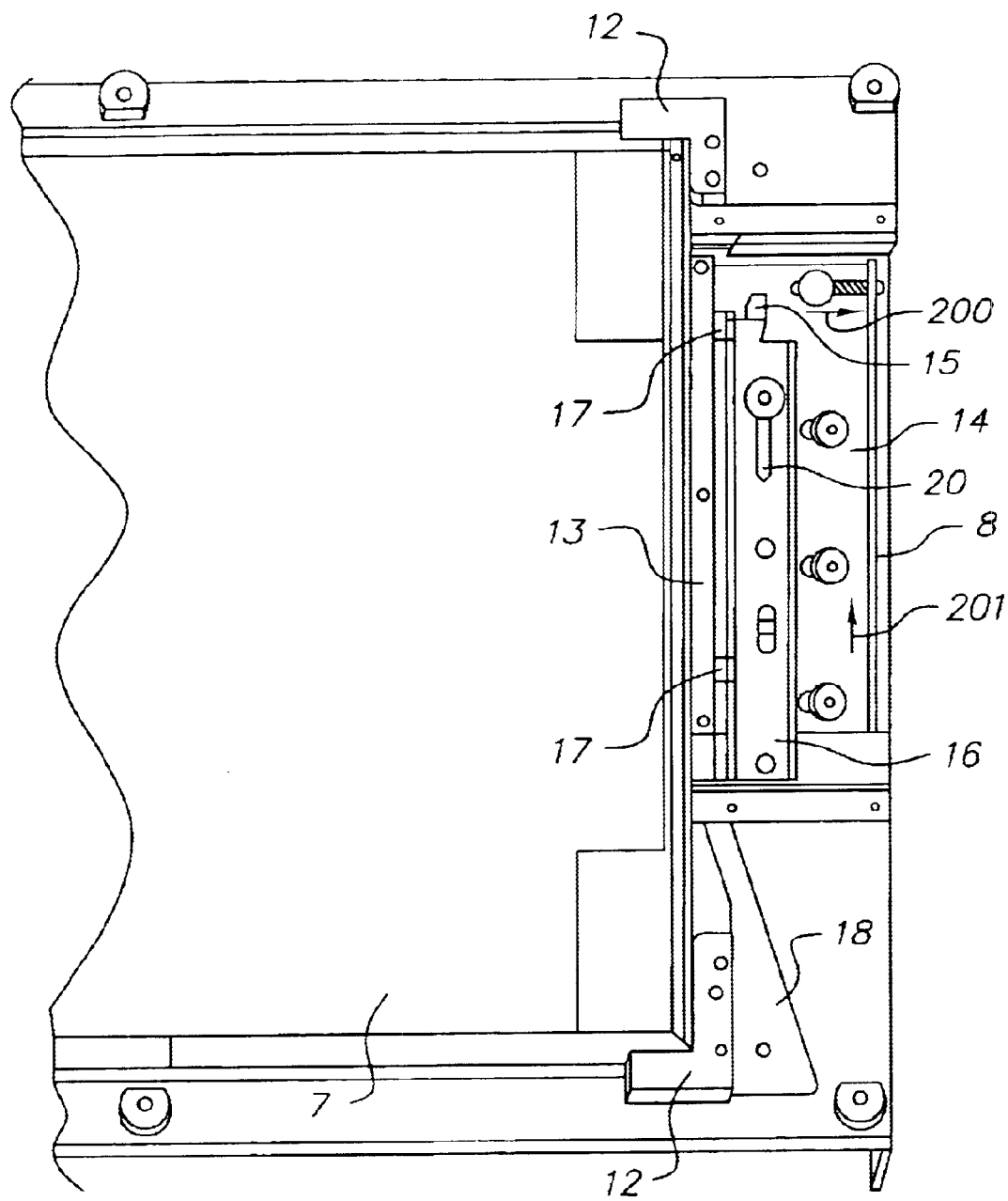
FIGS. 5 and 6 are diagrammatic views useful in explaining the present invention.

FIG. 5 depicts the unlatch mechanism (8) in greater detail. Guide blocks (12) direct the cassette shell (7) into the mechanism (8). A cassette block (13) is secured to a spring loaded translation plate (14). As the cassette forces the spring loaded translation plate (14) to move in the direction arrow (200), the firing lug (15) also moves, allowing the hook plate (16) to translate in a perpendicular direction (201) to plate (14). Hooks (17) are an integral feature of hook plate (16). These hooks enter slots in the image plate contained in shell (7). The translation motion of the hooks (17) releases the image plate from the cassette shell (7). Once the cassette shell (7) has been removed, a locking pawl (18) slightly rotates due to its own mass causing it to rotate about a pivot point such that it does not allow the mechanism (14) to be reset inadvertently. Upon reinsertion of the cassette shell (7), the cassette shell (7) forces the locking pawl (18) to rotate such that the spring loaded hook plate (16) is free to be reset. The reset is accomplished by manually applying force to the relatch handle (20) which moves the hook plate (16) back to its original position. The hooks (17) which are an integral feature of the hook plate (16) cause the image plate to be relatched with the cassette shell (7).

Figure 6:
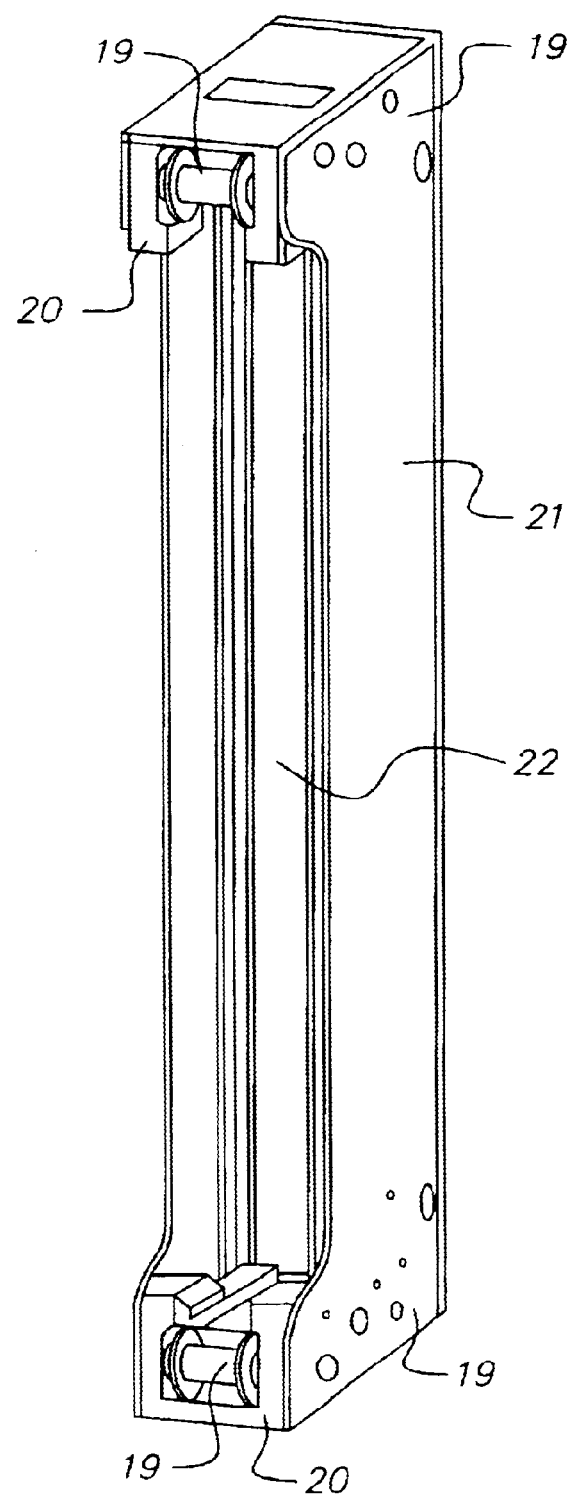

FIG. 6 depicts the light sealing/cassette guidance assembly in greater detail. The cassette is guided and controlled into the unlatch mechanism (8) via four guide rollers (19) mounted inside door (3). These rollers (19) are trapped in the roller guidance blocks (20) by the side plates (21) which also creates a light-tight box. At the entrance of the door (3), a light-shield (22) provides an aesthetically pleasing entrance and provides some amount of light protection. Behind the light shield (22), three rows of compliant plush (not shown) are arranged in a labyrinth fashion to provide a complete light seal once the cassette shell (7) has been removed.

The embodiment of the invention illustrated in the sketches is unique, in that prior inventions which utilize overlapping cassettes, has been improved upon and differentiated by removing the cassette structure for every other cassette. This has the added advantage of reducing artifacts that may be caused by these structures. Software that does not require the use of an alignment grid also offers distinct advantages.

The invention has been described in detail with particular reference to certain preferred embodiments thereof, but it will be understood that variations and modifications can be effected within the spirit and scope of the invention.

Parts List 1 main frame
2 fixed base
3 door
4 hinge
5 special handle
6 light sealing plush
7 cassette shell
8 unlatch mechanism actuator
9 clamp extrusions
10 semi-circular grips
11 anti-close feature
12 guide blocks 13 cassette block
14 spring loaded transition plate
15 firing lug
16 hook plate
17 hooks
18 locking pawl
19 guide rollers
20 roller guide blocks
21 side plates
22 light shield
101 cassette
102 cassette
103 cassette
104 cassette
105 cassette plate
106 image plate
107 cassette plate
108 image plate
109,110 recesses
111 spring loaded rollers
200 direction arrow
201 perpendicular direction

What is claimed is:

1. Apparatus for radiographically imaging elongated objects comprising:
   a main frame;
   a base mounted on said main frame;
   a first support on said base for supporting a first cassette containing a first storage phosphor imaging plate;
   a door hingedly mounted on said base for movement between open and closed positions;
   said door having a light-tight enclosure for supporting a second cassette containing a second storage phosphor imagine plate removably mounted within a cassette shell; and
   a first mechanism for removing said cassette shell from said second storage phosphor imaging plate which remains supported within said light-tight enclosure;
   such that, when said door is in said closed position, said second storage phosphor imaging plate overlaps said first storage phosphor imaging plate, whereby an elongated object can be radiographically imaged onto said overlapping first and second storage phosphor imaging plates.

2. The apparatus of claim 1 wherein said base is slidably mounted on said main frame.

3. The apparatus of claim 1 including a second support on said base for supporting a third cassette containing a third storage phosphor imaging plate;
   such that when said door is in said closed position, said second storage phosphor imaging plate overlaps said first and third storage phosphor imaging plates.

4. The apparatus of claim 3 including a fourth cassette supported by said light-tight enclosure of said door, said fourth cassette including a fourth storage phosphor imaging plate removably mounted within a cassette shell; and
   a second mechanism for removing said cassette shell from said fourth storage phosphor imaging plate which remains supported within said light-tight enclosure; such that when said door is in said closed position, said fourth storage phosphor imaging plate overlaps said third storage phosphor imaging plate.

5. The apparatus of claim 1 wherein said second cassette includes a handle mounted on said cassette shell for facilitating removal of said cassette shell from said second storage phosphor imaging plate.

6. The apparatus of claim 4 wherein said second and fourth cassettes include handles mounted on said respective cassette shells for facilitating removal of said cassette shells from said respective second and fourth storage phosphor imaging plates.

7. A computed radiography cassette comprising:
   a cassette shell;
   a storage phosphor imaging plate removably contained within said cassette shell; and
   a handle detachably mounted on said cassette shell for facilitating removal of said cassette shell relative to said storage phosphor imaging plate.

8. A method of radiographically imaging an elongated object comprising:
   positioning a first cassette containing a first storage phosphor imaging plate in overlapping relationship with a second storage phosphor imaging plate which has been removed from its cassette; and
   exposing said overlapped first and second storage phosphor imaging plates to a radiographic image of an elongated object wherein said second plate is closer to said source of said radiographic image than said first plate.

9. A method of radiographically imaging an elongated object comprising:
   positioning first and third cassettes respectively containing first and third storage phosphor imaging plates in spaced relationship and positioning a second storage phosphor imaging plate which has been removed from its cassette in overlapping relationship with said first and third storage phosphor imaging plates; and
   exposing said overlapped first, second and third storage phosphor imaging plates to a radiographic image of an elongated object, wherein said second plate is closer to said source of said radiographic image than said first and third plates.

10. A method of radiographically imaging an elongated object comprising:
    positioning first and third cassettes respectively containing first and third storage phosphor imaging plates in spaced relationship, positioning a second storage phosphor imaging plate which has been removed from its cassette in overlapping relationship with said first and third storage phosphor imaging plates, and positioning a fourth storage phosphor imaging plate which has been removed from its cassette in overlapping relationship with said third storage phosphor imaging plate; and
    exposing said first, second, third and fourth storage phosphor imaging plates to a radiographic image of an elongated object, wherein said second and fourth plates are closer to said source of said radiographic image than said first and third plates.

* * * * *